(12) United States Patent
Snir

(10) Patent No.: US 12,229,043 B1
(45) Date of Patent: Feb. 18, 2025

(54) METHOD AND SYSTEM FOR DYNAMIC WINDOWS TRAFFIC IN EMULATION SYSTEMS

(71) Applicant: Cadence Design Systems, Inc., San Jose, CA (US)

(72) Inventor: Yafit Snir, Gedera (IL)

(73) Assignee: Cadence Design Systems, Inc., San Jose, CA (US)

( * ) Notice: Subject to any disclaimer, the term of this patent is extended or adjusted under 35 U.S.C. 154(b) by 81 days.

(21) Appl. No.: 17/833,721

(22) Filed: Jun. 6, 2022

(51) Int. Cl.
  *G06F 11/36* (2006.01)
  *G06F 9/455* (2018.01)
  *G06F 11/34* (2006.01)

(52) U.S. Cl.
  CPC ...... *G06F 11/3692* (2013.01); *G06F 9/45545* (2013.01); *G06F 11/3409* (2013.01); *G06F 11/3684* (2013.01); *G06F 11/3688* (2013.01)

(58) Field of Classification Search
  CPC ............ G06F 9/45545; G06F 11/3692; G06F 11/3409; G06F 11/3684; G06F 11/3688
  See application file for complete search history.

(56) References Cited

U.S. PATENT DOCUMENTS

| | | | | |
|---|---|---|---|---|
| 7,050,963 B2* | 5/2006 | Flavin | ..................... | H04L 67/75 709/227 |
| 8,229,726 B1* | 7/2012 | Magdon-Ismail | ...... | G06F 30/33 703/22 |
| 8,954,309 B2* | 2/2015 | B'Far | .................. | G06F 11/3447 703/22 |
| 9,071,550 B2* | 6/2015 | Tang | .................... | G06F 11/3466 |
| 9,529,963 B1* | 12/2016 | Wilson | ........... | G01R 31/318357 |
| 9,569,569 B1* | 2/2017 | Colon | ..................... | G06F 30/33 |
| 9,704,216 B1* | 7/2017 | Laskar | .................... | G06F 3/012 |
| 10,581,695 B2* | 3/2020 | Khurana | ............... | H04L 41/145 |
| 10,614,156 B1* | 4/2020 | Stansell | ................ | G06F 40/114 |
| 10,650,172 B1* | 5/2020 | Pajerski | ................. | G06F 30/17 |
| 11,693,857 B1* | 7/2023 | Jindal | ............... | G06F 16/24545 707/720 |
| 2007/0265822 A1* | 11/2007 | Mathewson | ........ | G06F 11/3636 703/22 |
| 2012/0151490 A1* | 6/2012 | Zhang | ................... | G06F 9/5094 718/102 |
| 2012/0310870 A1* | 12/2012 | Caves | ................. | G06F 11/2247 706/14 |
| 2014/0136668 A1* | 5/2014 | Brunswig | ............ | G06F 9/5072 709/222 |

(Continued)

*Primary Examiner* — Douglas M Slachta
(74) *Attorney, Agent, or Firm* — Foley & Lardner LLP (57) ABSTRACT

Systems and methods of collecting performance metrics of an emulated design are disclosed. A method includes receiving, by a processor in the emulation system from a host system, configuration data including one or more user defined parameters, connecting, by the processor, a performance monitor to a port between communicatively connected components in the emulation system, initiating, by the processor, an emulation of the DUT, receiving, by the processor, emulation data from the emulation system, calculating, by the processor, performance data based on the configuration data, filtering, by the processor, the emulation data based on the performance data, and outputting, by the processor, the filtered emulation data to the host system.

20 Claims, 8 Drawing Sheets

(56) References Cited

U.S. PATENT DOCUMENTS

| | | | |
|---|---|---|---|
| 2014/0337000 A1* | 11/2014 | Asenjo | G06Q 10/06 |
| | | | 703/13 |
| 2016/0203009 A1* | 7/2016 | Catalano | G06F 9/455 |
| | | | 703/26 |
| 2018/0046561 A1* | 2/2018 | Enright | G06F 11/3024 |
| 2018/0314774 A1* | 11/2018 | Khosrowpour | G06F 11/302 |
| 2019/0042129 A1* | 2/2019 | Tarango | G06F 11/3034 |
| 2019/0042293 A1* | 2/2019 | Cornett | G06F 9/45558 |
| 2020/0272548 A1* | 8/2020 | Carrington | G06F 11/261 |
| 2022/0004427 A1* | 1/2022 | Savant | G06F 9/44505 |
| 2022/0129360 A1* | 4/2022 | Bryan | G06F 11/3075 |

* cited by examiner

METHOD AND SYSTEM FOR DYNAMIC WINDOWS TRAFFIC IN EMULATION SYSTEMS

TECHNICAL FIELD

The present implementations relate generally to emulation systems, and more particularly to monitoring traffic using dynamic windows in emulation systems.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs.

A significant function of EDA tools is emulation of a user logical system (e.g., an IC design) to perform pre-silicon functional verification, firmware and software development, and post-silicon debug. To achieve this, a typical processor-based emulation system comprises several Application Specific Integrated Circuits (ASICs) all working together to execute a program generated by an emulation compiler generated from the user's IC design. The compiled program models a design under test (DUT) that is a logical representation of the user's IC design running on the emulation system.

The user is often interested in not just the functionality of the DUT, but performance and statistics of the DUT as well. Conventional emulation systems may require a long time to output large amounts of data output from the DUT to generate meaningful and interesting data, which can result in inefficiencies.

SUMMARY

What is therefore needed is an emulation system and method that support dynamic windowing and collection of emulated data. The present disclosure describes emulation systems including a highly configurable filter controller to automatically detect regions of interest on the emulator side during run time. The filter controller may perform smart windowing control (SWC) operations. The emulated data output from the emulated DUT may be streamed and recorded from the hardware to software only during specific time regions, which are identified automatically at run-time, based on user configuration. A window and a buffer can be used together to calculate bandwidth and latency variance in configurable resolutions. Filtering can also be done based on specific traffic attributes. In addition, the data may be compressed in a custom format to reduce traffic throughput between hardware and software. Then data may be decompressed during the post-process phase. Accordingly, a filter controller may advantageously optimize the run time, the size of the generated logs, and the time it takes a performance analysis tool to process this data. This may lead to a significant increase efficiency in both time and hardware resources at the host.

One aspect includes a method for emulating a DUT using a system including an emulation system and a host system. The method includes receiving, by a processor in the emulation system from a host system, configuration data including one or more user defined parameters, connecting, by the processor, a performance monitor to a port between communicatively connected components in the emulation system, initiating, by the processor, an emulation of the DUT, receiving, by the processor, emulation data from the emulation system, calculating, by the processor, performance data based on the configuration data, filtering, by the processor, the emulation data based on the performance data, and outputting, by the processor, the filtered emulation data to the host system.

In some embodiments, the one or more user defined parameters includes a window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

In some embodiments, filtering the emulation data includes comparing, by the processor, one of the one or more user defined parameters against the performance data from the performance monitor. Filter may also include, when the comparison is satisfied, providing, by the processor, the emulation data to the host system, and when the comparison is not satisfied, erasing, by the processor, the emulation data.

In some embodiments, the method further includes storing, in a first buffer of the emulation system, emulation data during a first window, and storing, in a first second of the emulation system, emulation data during a second window following the first window.

In some embodiments, the method further includes comparing, by the processor, the performance data of the first buffer against the performance data of the second buffer. The method may further include when the performance data of the second buffer is greater than the filtered emulation data of the first buffer, outputting, by the processor, the filtered emulation data of the second buffer to the host system, and when the emulation data of the second buffer is less than or equal to the emulation data of the first buffer, erasing, by the processor, the emulation data of the second buffer.

In some embodiments, the calculating the performance data includes counting a number of times when one or more signals of the emulation data are asserted.

In some embodiments, the one or more signals of the emulation data include Advanced eXtensible Interface (AXI) protocol signals.

In some embodiments, calculating the performance data includes performing one or more logic operations using one or more AXI protocol signals.

Another aspect includes a system for monitoring performance of an emulated design under test. The system includes one or more processor having instructions stored thereon that, when executed by the one or more processors, causes the one or more processors to receive, from a host system, configuration data including one or more user defined parameters, connect a performance monitor to a port between communicatively connected components in an emulation system, receive, from the performance monitor, emulation data of the DUT output from the emulation system, calculate performance data based on the configuration data, filter the emulation data based on the performance data, and output the filtered emulation data to the host system.

In some embodiments, the one or more user defined parameters includes a window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

In some embodiments, filtering the emulation data includes comparing, by the processor, one of the one or more user defined parameters against the performance data from the performance monitor. The filtering may also include when the comparison is satisfied, providing, by the processor, the emulation data to the host system, and when the comparison is not satisfied, erasing, by the processor, the emulated data.

In some embodiments, the system further includes storing, in a first buffer of the emulation system, emulation data during a first window, and storing, in a second buffer of the emulation system, emulation data during a second window following the first window.

In some embodiments, the system further includes comparing, by the processor, the performance data of the first buffer against the performance data of the second buffer. In some embodiments, the system further includes when the performance data of the second buffer is greater than the performance data of the first buffer, outputting, by the processor, the emulation data of the second buffer to the host system, and when the performance data of the second buffer is less than or equal to the performance data of the first buffer, erasing, by the processor, the emulation data of the second buffer.

In some embodiments, the calculating the performance data includes counting a number of times when one or more signals of the emulation data are asserted.

In some embodiments, the one or more signals of the monitored data include AXI protocol signals.

In some embodiments, calculating the performance data includes performing one or more logic operations using one or more AXI protocol signals.

Another aspect is a non-transitory computer readable medium including one or more instructions stored thereon and executable by a processor to connect a performance monitor to a port between communicatively connected components in the emulation system, initiate an emulation of the DUT, receive emulation data output from the emulation system, calculate performance data based on the configuration data including one or more user defined parameters, filter the emulation data based on the performance data, and output the filtered emulation data to the host system.

In some embodiments, the one or more user defined parameters includes a window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

In some embodiments, filtering the emulation data includes comparing, by the processor, one of the one or more user defined parameters against the performance data from the performance monitor, when the comparison is satisfied, providing, by the processor, the emulation data to the host system, and when the comparison is not satisfied, erasing, by the processor, the emulation data.

In some embodiments, the instructions further cause the processor to store, in a first buffer of the emulation system, emulation data during a first window, and store, in a second buffer of the emulation system, emulation data of a second window following the first window.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

An emulator that emulates a DUT can output signals to a host system through which a user can analyze the output signals. Oftentimes the data is analyzed not just for accuracy (e.g., whether the output signals have values that are what is expected at the proper times), but users may be interested in performance metrics of the DUT. For example, the user may wish to know how many open transactions are still present at any given time, the open transactions including data requests made by the host system that have not been returned yet. As another example, the user may wish to understand an average latency in the read and write operations. This can help understand how much of delay there is in the control and/or data paths within the DUT.

Emulation systems can use parallel ports (e.g., using AXI) connected to the host system to receive emulated output signals from the emulators. In order to analyze the performance metrics in emulation systems with multiple processors and memories, there is a need to record traffic activity on different AXI ports during the test run. This is usually done using a monitor/tracker on the RTL side at the emulator, which dumps the traffic to the host side, e.g., using System Verilog Direct Programming Interface with C (DPI-C) calls. On the host side, the traffic can either be logged to a file or database and processed after the acceleration run or processed at run-time.

The processed traffic data can be used by performance analysis tools to debug performance issues resulting from configuration or architectural bugs of the DUT. When running performance benchmarks on large systems, the amount of data generated and recorded during emulation runs can be huge. This may require large quantities of resources for saving the data and processing it. Storage required for saving the huge log files on the host side can be very expensive. Further, streaming large amounts of data at a high data rate from the emulator to the host degrades the run time. Also, the post-processing performance analysis time increases significantly with huge amounts of data, making it infeasible to receive results in reasonable time, and in many cases, may require high support effort from field engineers and research and development teams.

Some emulation data processing tools allow windows that can include interesting time intervals e.g., time ranges that include the data that the user is interested in. Using a pre-configurable time intervals to determine when to turn on/off the recording, this may reduce the amount of emulated data passed from emulator (hardware) to the host (software) and provides some remedy to the aforementioned issues. However, for long tests, which involves heavy traffic, it is difficult to predict and determine when the relevant times are. Fine-tuning the configuration can be an exhaustive task and can lead to oversight of performance issues, as conventional tools (or users of the conventional tools) do not have a way to know how to configure the intervals or windows except through manual trial and error. This process can be error prone and very time consuming, especially because the full output data needs to be saved or recorded first. Accordingly, there is a need for emulation systems to automatically and intelligently capture the interesting activity in the emulated data so that only the interesting emulation data can be easily and quickly output to the host machine for analysis without using excessive amounts of resources.

In some embodiments, the emulation systems include a synthesizable and highly configurable filter controller to automatically detect regions of interest on the emulator side during run time. The filter controller may perform smart windowing control (SWC) operations. The traffic output from the emulated DUT may be streamed and recorded from the hardware to software only during specific time regions, which are identified automatically at run-time, based on user configuration. A window and a buffer can be used together to calculate bandwidth and latency variance in configurable resolutions. Filtering can also be done based on specific traffic attributes. In addition, the data may be compressed in a custom format to reduce traffic throughput between hardware and software. Then data may be de-compressed during the post-process phase. Accordingly, a filter controller may advantageously reduce the amount of data it takes to output this data to the host machine as well as reduce time, since not all of the data needs to be transferred. This may lead to a significant increase efficiency in both time and hardware resources at the host.

Figure 1:
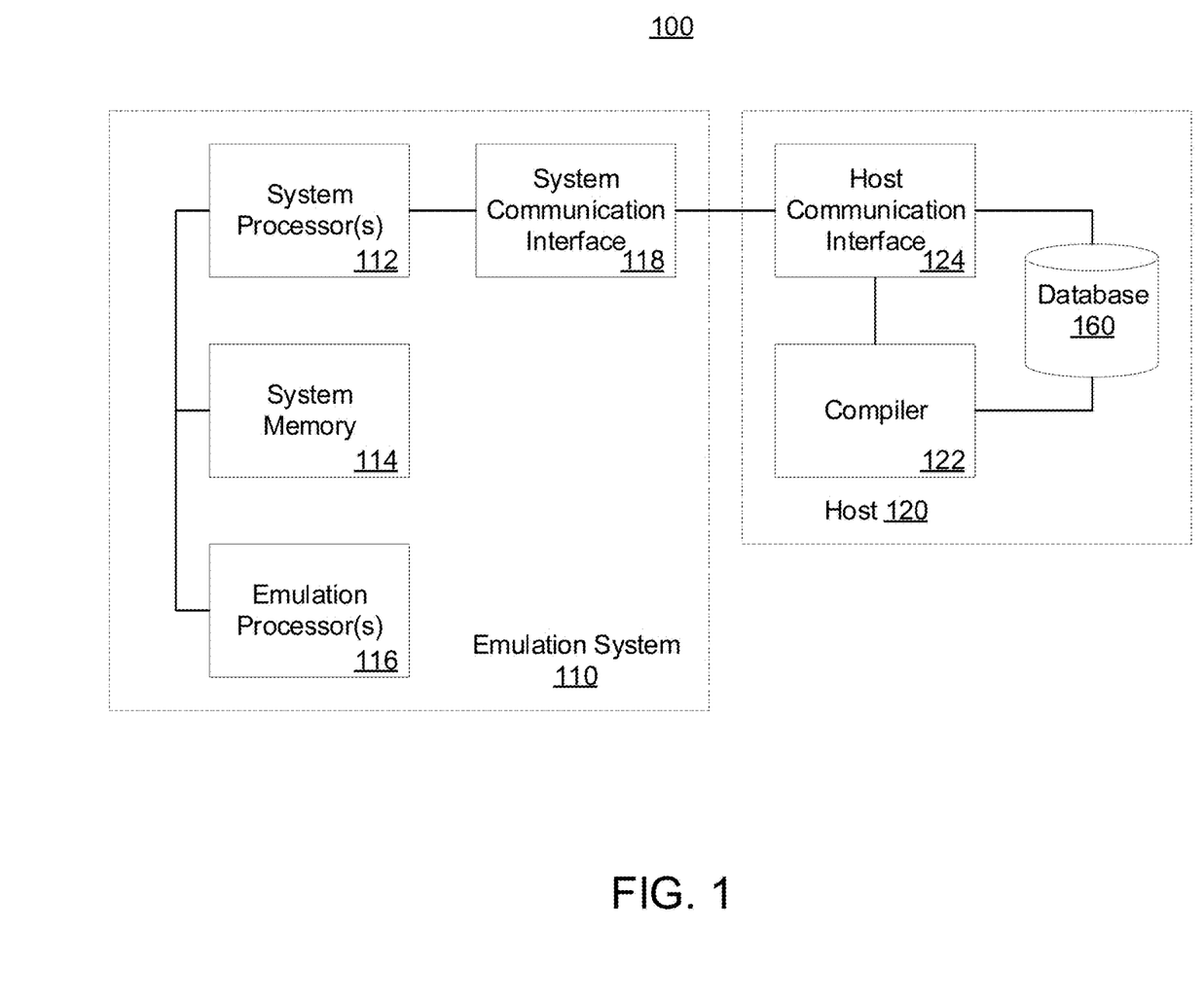
FIG. 1 illustrates an emulation system, in accordance with some embodiments.

FIG. 1 illustrates a system 100, in accordance with some embodiments. As illustrated by way of example in FIG. 1, a system 100 can include an emulation system 110 and a host 120. The emulation system 110 can include a system processor 112, a system memory 114, one or more emulation processor(s) 116, and a system communication interface 118. The host 120 can include a compiler 122 and a host communication interface 124.

The system processor 112 can execute one or more instructions associated with the emulation system 110. The system processor 112 can include an electronic processor, an integrated circuit, or the like including one or more of digital logic, analog logic, digital sensors, analog sensors, communication buses, volatile memory, nonvolatile memory, and the like. The system processor 112 can include, but is not limited to, at least one microcontroller unit (MCU), microprocessor unit (MPU), central processing unit (CPU), graphics processing unit (GPU), physics processing unit (PPU), embedded controller (EC), or the like. The system processor 112 can include a memory operable to store or storing one or more instructions for operating components of the system processor 112 and operating components operably coupled to the system processor 112. The one or more instructions can include at least one of firmware, software, hardware, operating systems, embedded operating systems, and the like. The system processor 112 or the system 112 generally can include at least one communication bus controller to effect communication between the system processor 112 and the other elements of the emulation system 110.

The system memory 114 can store data associated with the emulation system 110. The system memory 114 can include one or more hardware memory devices to store binary data, digital data, or the like. The system memory 114 can include one or more electrical components, electronic components, programmable electronic components, reprogrammable electronic components, integrated circuits, semiconductor devices, flip flops, arithmetic units, or the like. The system memory 114 can include at least one of a non-volatile memory device, a solid-state memory device, a flash memory device, and a NAND memory device. The system memory 114 can include one or more addressable memory regions disposed on one or more physical memory arrays. A physical memory array can include a NAND gate array disposed on, for example, at least one of a particular semiconductor device, integrated circuit device, and printed circuit board device.

The emulation processor(s) 116 may execute one or more emulation instructions associated with corresponding parameters of a computing device or hardware system, for example. The emulation processor(s) 116 may each include an electronic processor, an integrated circuit, or the like including one or more of digital logic, analog logic, digital sensors, analog sensors, communication buses, volatile memory, nonvolatile memory, and the like. The emulation processor(s) 116 may each include one or more emulation cores, emulation registers, or emulation caches, for example, to execute the emulation instructions and perform a hardware-level emulation of a particular computing device or hardware system defined by the emulation instructions. The emulation processor(s) 116 generally may each include at least one communication bus controller to effect communication between the emulation processor(s) 116 and the other elements of the emulation system 110. The emulation processor(s) 116 may each include a processor memory that may store one or more instructions for operating components of a corresponding emulation processor 116 and operating components operably coupled to the corresponding emulation processor 116. The one or more instructions may include at least one of firmware, software, hardware, operating systems, embedded operating systems, emulation instructions and the like. The processor memory may receive emulation instructions and may store the emulation instructions at one or more memory locations of the processor memory. The processor memory may include one or more processor caches, or processor memory blocks, for example, that may operate at higher throughput, bandwidth, or the like, than the system memory 114. As one example, the processor memory may include at least one DDR memory.

The system communication interface 118 may communicatively couple the emulation system 110 and the host 120, and may be integrated with the emulation system 110. The system communication interface 118 may communicate one or more instructions, signals, conditions, states, or the like between one or more of the emulation system 110 and the host 120. The system communication interface 118 may include one or more digital, analog, or like communication channels, lines, traces, or the like. As one example, the system communication interface 118 may include at least one high-bandwidth, serial or parallel communication line among multiple communication lines of a communication interface. The system communication interface 118 may include one or more wireless communication devices, systems, protocols, interfaces, or the like. The system communication interface 118 may include one or more logical or electronic devices including but not limited to integrated circuits, logic gates, flip flops, gate arrays, programmable gate arrays, and the like. The system communication interface 118 may include ones or more telecommunication devices including but not limited to antennas, transceivers, packetizers, and wired interface ports.

The compiler 122 may include one or more graphical user interfaces and one or more command line interfaces. The host communication interface 124 may communicatively couple the emulation system 110 and the host 120, and may be integrated with the host 120. The host communication interface 124 may correspond at least partially in one or more of structure and operation to the system communication interface 130.

Figure 2:
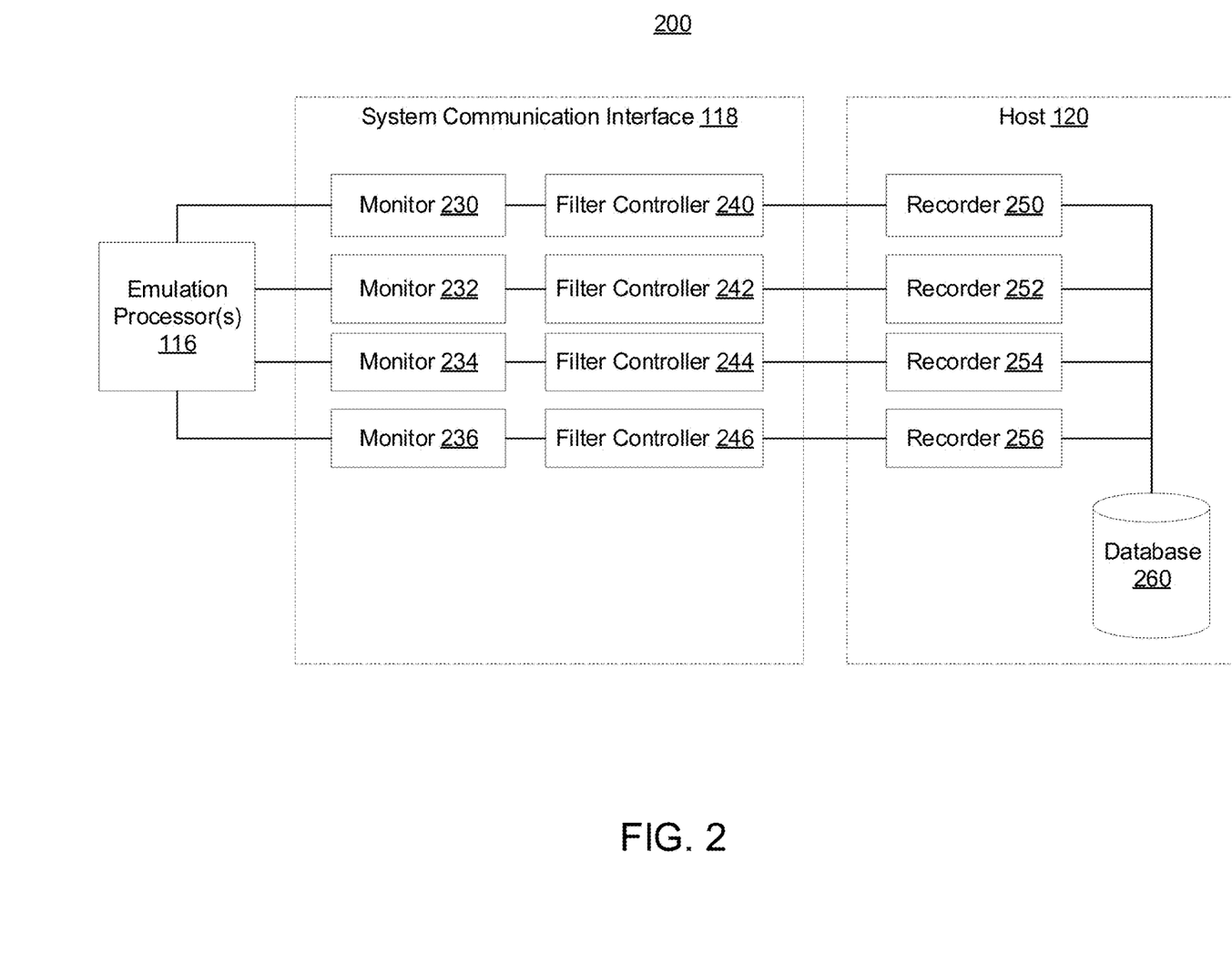
FIG. 2 illustrates a block diagram of an emulation system, in accordance with some embodiments.

FIG. 2 illustrates a block diagram of an emulation system 200, in accordance with some embodiments. The emulation system 200 may be similar to the system 100. The emulation system 200 includes the emulation processor 116 of FIG. 1, the system communication interface 118 of FIG. 1, and the host 120. However, embodiments are not limited thereto, and the emulation system 200 may have more or fewer and/or different components therein. For example, for the sake of simplicity and ease of description, a system memory (e.g., system memory 114) and a system processor (e.g., system processor 112) are not shown.

As discussed with respect to FIG. 1, the emulation processor 116 may execute instructions that model a DUT in hardware. Various outputs generated from the emulation processor(s) 116 may be output and sent to the host 120 so that the emulation data can be analyzed and filtered before being transferred to the host 120. Accordingly, repeated descriptions are omitted.

The system communication interface 118 may include monitors 230, 232, 234, and 236 and a filter controller 240, 242, 244, and 246. Although the emulation system 200 of FIG. 2 shows four monitors 230-236 and four filter controllers 240-246, embodiments are not limited thereto and there may be more or fewer monitors and filter controllers depending on how many channels with which the emulation processor(s) 116 is communicating.

The monitors 230-236 may include AXI monitors that receive data that is output by the emulation processor 116. Each of the monitors 230-236 may be connected to one or more interfaces (or ports or nodes) (not shown) in the emulation system 110 so that the user is able to monitor performance data at specific nodes. For example, each of the monitors 230-236 may be connected to any interface between an AXI master and an AXI slave. The monitors 230-236 may provide AXI traffic (e.g., all signals used by the AXI master and slave).

The filter controllers 240-246 may be connected between the respective AXI monitors 230-236 and recorders 250, 252, 254, and 256 of the host 120. Each of the filter controllers 240-246 may be able to measure performance metrics based on the AXI traffic output from the monitors 230-236. The performance metrics may include bus latency, amount of memory traffic (e.g., bandwidth), and others. As discussed above, a problem with using only conventional monitors (e.g., AXI monitors) is that users are not able to capture the performance data that is interesting to the user. For example, the user may be only interested in performance data that is above or below a certain bandwidth threshold, or detected latency that is above a certain latency threshold. The AXI monitors are not configurable to provide the interesting data that the user is interested in. Each of the filter controllers 240-246 includes an ability for the user to configure various parameters such that performance data that is interesting to the user may be captured without excessive run times or large amounts of memory being consumed at the host 120. The emulation data captured at the monitors 230-236 are transmitted to the filter controllers 240-246 to calculate or determine various performance data per window. Various parameters may be set or configured such that the filter controllers 240 can set a window size (in clocks resolution), different ranges of bandwidth, minimum/maximum latency, and minimum/maximum outstanding transactions. Each of these configuration parameters for capturing performance data is described in detail below.

The host 120 includes recorders 250, 252, 254, and 256 respectively connected to the filter controllers 240-246, and the output of the recorders 250-256 are provided to a database 260. The recorders 250-256 may receive data from the filter controllers 240-246 such that the data is pre-processed and saved to the database 260.

In operation, output data is streamed from the emulation processor(s) 116 to the monitors 230-236. The monitors 230-236 indiscriminately captures the emulation data. The filter controller 240-246 may be used to calculate performance data and statistics based on the emulation data from the monitors 230-236. The emulation data can be can either be propagated to the host 120, or dropped (or dumped or erased) so that the host 120 does not save the data. The filter controllers 240-246 can configure the windows using the configuration parameters to determine whether to transmit the emulation data to the host 120 or erase the emulation data. Once the interesting performance data passes the criteria configured in the filter controllers 240-246, filtered emulation data may be sent to the host 120, logged and processed by a tool in the host 120 for visualization of the emulation data and verification.

Figure 3:
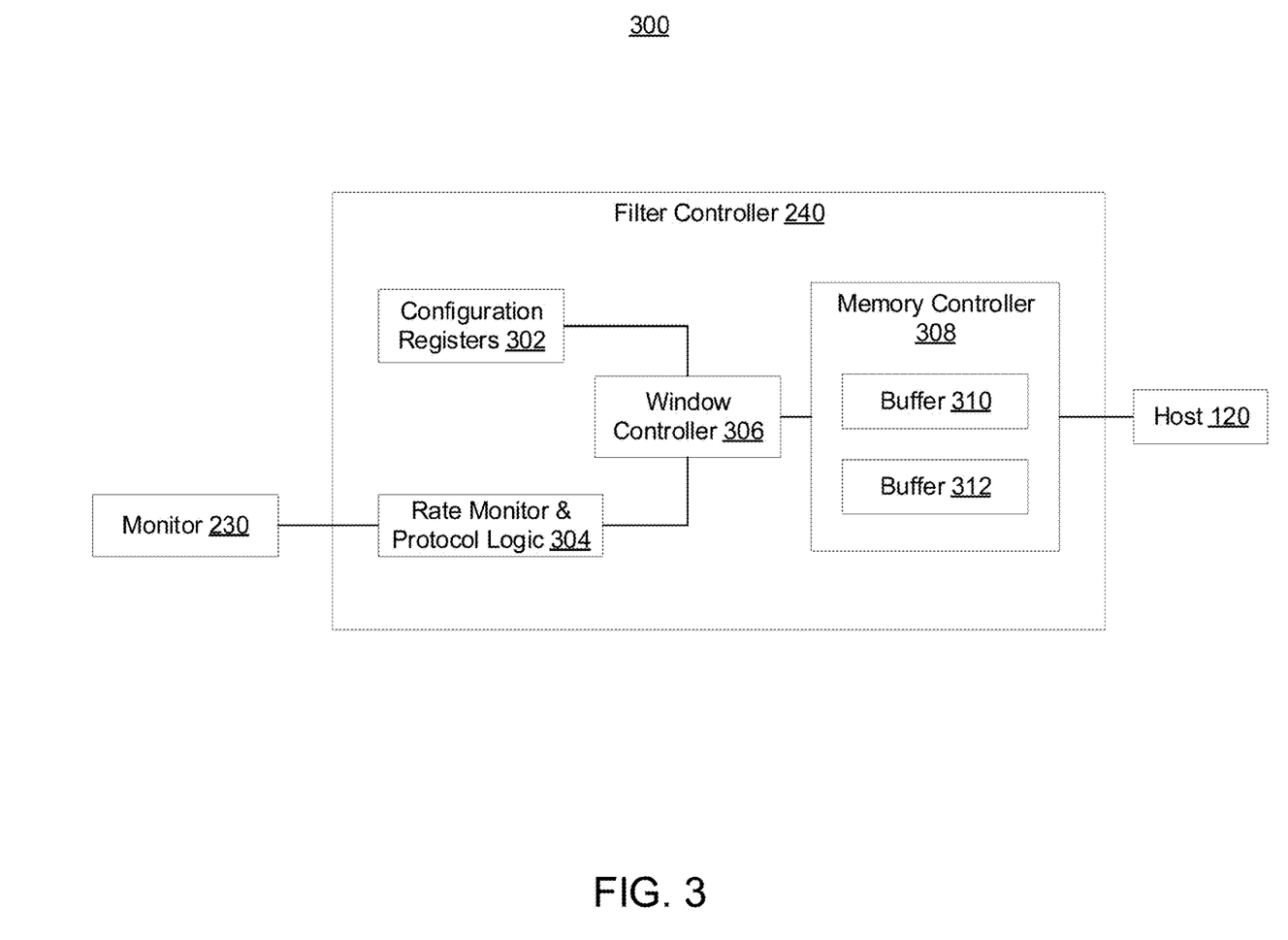
FIG. 3 illustrates a block diagram of an emulation system including a more detailed view of the filter controller, in accordance with some embodiments.

FIG. 3 illustrates a block diagram of an emulation system 300 including a more detailed view of the filter controller 240, in accordance with some embodiments. The emulation system 300 may be similar to the emulation systems 100 and/or 200. The emulation system 300 includes the monitor 230 from FIG. 2, the filter controller 240 from FIG. 2, and the host 120 from FIGS. 1 and 2. Accordingly repeated descriptions are omitted for simplicity and clarity. The filter controller 240 may include configuration registers 302, rate monitor & protocol logic 304, a window controller 306, and a memory controller 308 including buffers 310 and 312.

As discussed above, the monitor 230 can capture AXI traffic data coming out of the respective port connected to the emulated circuit or an emulation processor (e.g., emulation processor(s) 116). Not all of the emulation data captured by the monitor 230 may be interesting to the user. The filter controller 240 receives the emulation data from the monitor 230 for filtering. Then the filter controller 240 may output the filtered emulation data to the host 120.

The configuration registers 302 may be initialized by the user to store configuration data. For example, the configuration registers 302 may store various configuration parameters set by the user for capturing performance data. The configuration registers 302 may be set before the emulation of the DUT is run. The host 120 can receive an input from the user which may be transmitted and stored in the configuration registers 302 for reading during run time or prior to run time.

The configuration registers 302 may include, for example, the size of the window in clock cycles. The user can set multiple window sizes such that the monitor 230 (or monitors 230-236) can collect and perform performance data calculations for all of the window sizes. The user may also define the number of latency ranges to monitor. For example, the user may set a minimum and/or maximum latency that the user is interested in. The user may further define the number of outstanding transaction ranges to monitor. For example, the user may define the minimum and/or maximum number of outstanding transactions exist at any given time and within the window.

The rate monitor & protocol logic 304 may include logic that can calculate a performance data of a given window. The rate monitor & protocol logic 304 may receive various channel signals (e.g., AXI traffic) from the monitor 230 including signals that are described with respect to FIGS. 5 and 6 described below. The channel signals may be organized in channels including read/write address channel, read/write data channels, and read/write response channels. The signals may be used to calculate the performance data including read and/or write latency, read and/or write bandwidth, the number of outstanding transactions, beat size counts, and/or burst length counts.

The window controller 306 may read the configuration parameters from the configuration registers 302 and receive the emulation data calculated by rate monitor & protocol logic 304. The window controller 306 may then determine whether to record full traffic data of the current ending window. This determination may be made by comparing the calculated performance data that was received from the rate monitor & protocol logic 304 against the user-defined performance parameters that are saved in the configuration registers 302. Depending on what the user wants, the comparison may result in the calculated performance data being transmitted to the memory controller 308 or being dumped (or erased or flushed).

For example, the user may define in the configuration registers 302 that the user only wants to collect emulated data and/or performance data that has a bandwidth that is greater than 6 Megabytes per second (MB/sec). Then the window controller 306 will retrieve from the appropriate configuration register 302 having the user-defined parameter of 6 MB/sec and compare the calculated bandwidth from the rate monitor & protocol logic 304 against the 6 MB/sec. If the calculated bandwidth is less than 6 MB/sec, the emulated data and/or the performance data will be dumped and not be transferred to the memory controller 308. On the other hand, if the calculated bandwidth is greater than 6 MB/sec, the emulated data and/or the performance data will be transferred to the memory controller 308 for storing and eventual transmission to the host 120. In some embodiments, the user may define a bandwidth range such that calculated performance data that falls outside the range may be dumped by the window controller 306.

As another example, the user may define in the configuration registers 302 that the user only wants to collected emulated data and/or performance data that has a latency that is greater than 10 clock cycles. Then the window controller 306 will retrieve from the appropriate configuration register 302 having the user-defined parameter of 10 clock cycles and compare the calculated latency from the rate monitor & protocol logic 304 against the 10 clock cycles. If the calculated latency is less than 10 clock cycles, the emulated data and/or the performance data will be dumped and not be transferred to the memory controller 308. On the other hand, if the calculated latency is greater than 10 clock cycles, the emulated data and/or the performance data will be transferred to the memory controller 308 for storing and eventual transmission to the host 120. In some embodiments, the user may define a latency range such that calculated performance data that falls outside the range may be dumped by the window controller 306.

A variety of user-defined parameters may be contemplated. For example, the user may set the minimum or maximum number of multiple outstanding transactions that have not been completed exist. As additional examples, the user may set a minimum or maximum beat size counts and/or burst length counts. One of ordinary skill will recognize that a variety of parameters may be defined by the user so that the user may capture only emulated data and/or performance data that the user is interested in.

The memory controller 308 may receive the filtered data from the window controller 306 and store the data in the buffers 310 or 312. The memory controller 308 may alternate writing to and erasing performance data output from the window controller 306 into the buffers 310 and 312. For example, the memory controller 308 may store the performance data output of a previous window into buffer 310. Then the memory controller 308 may store the performance data of a current window in the buffer 312. Then, depending on the user configurations, the memory controller 308 may compare the current performance data stored in the buffer 312 against the previous performance data stored in the buffer 310. And if the comparison results are interesting to the user, the memory controller 308 may output the current or previous performance data as filtered data to the host 120.

Figure 4:
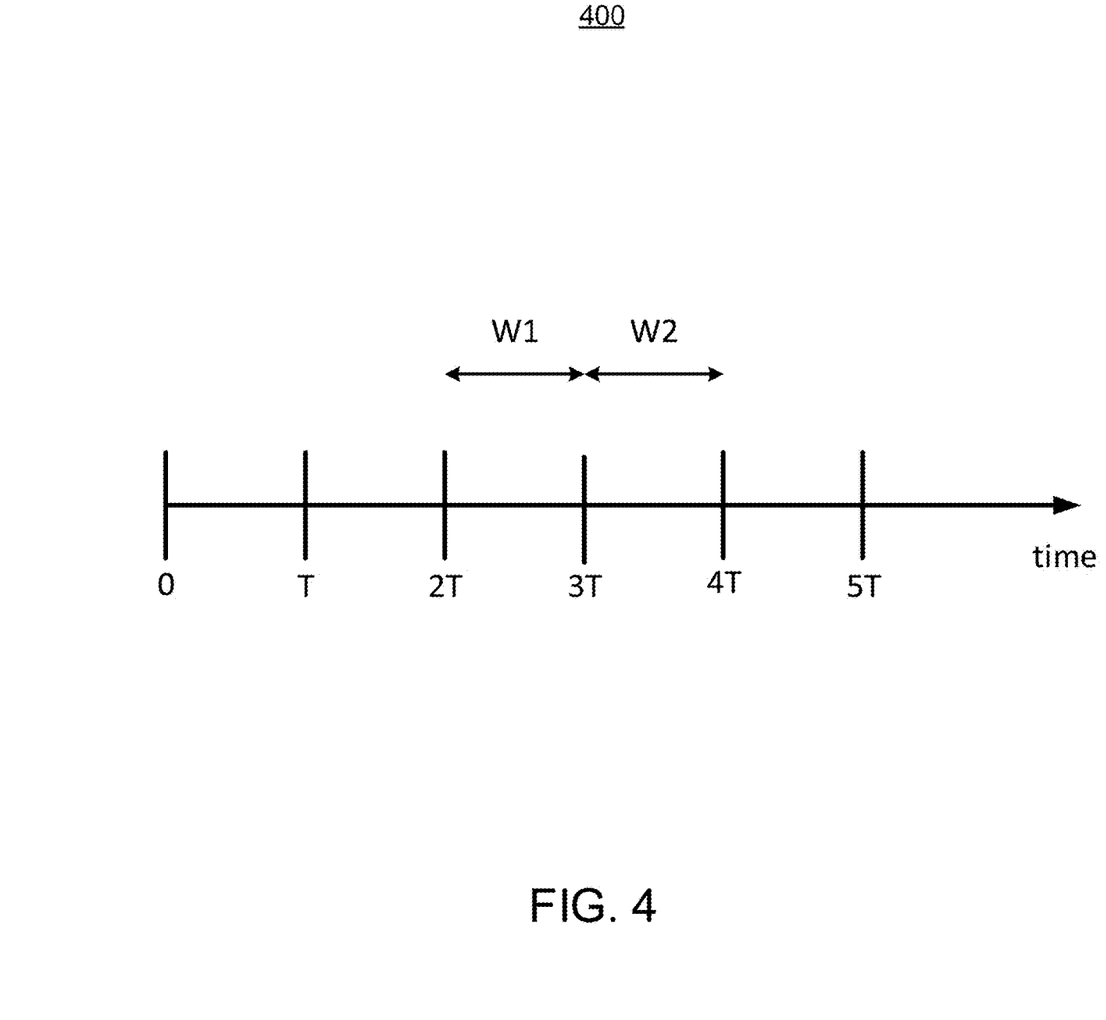
FIG. 4 illustrates a timeline including a first window and a second window, in accordance with some embodiments.

FIG. 4 illustrates a timeline 400 including a first time window W1 and a second time window W2, in accordance with some embodiments. In this example, the user has set a configuration parameter for the window size to be T. Accordingly, the filter controller (e.g., filter controller 240) may collect and store performance data for windows the size of T. Accordingly, the user can set time intervals corresponding to T as the window size. In some embodiments, the user may set the window size as a number of transactions instead of time.

The first and second windows W1 and W2 may respectively correspond to the previous and current windows described with respect to FIG. 3. Accordingly, the memory controller 308 may keep updated bandwidth and latency metrics per window, based on the data input arriving from the monitor (e.g., monitors 230-236).

Upon completion of a time window, the memory controller 308 may determine based on statistics and configuration to either record or discard the data in the previous or current window W1 or W2. Saving the performance data of the previous window W2 may allow calculating variances between two consecutive windows. For example, if the bandwidth calculated in the previous window W1 is 3 MB/s, and the bandwidth calculated in the current window W2 is more than 8 MB/s, the user may be interested in knowing the large variance between the previous and current windows W1 and W2. Accordingly, the previous performance data stored in the buffer 310, the current performance data stored in the buffer 312, or both sets of performance data may be provided to the host 120. Using such window and inter-window information, combined with the user configuration, the filter controller 240 may decide at run time whether a specific time window should be recorded (e.g., the data in the buffer is transmitted to the host 120) or discarded.

Figure 5:
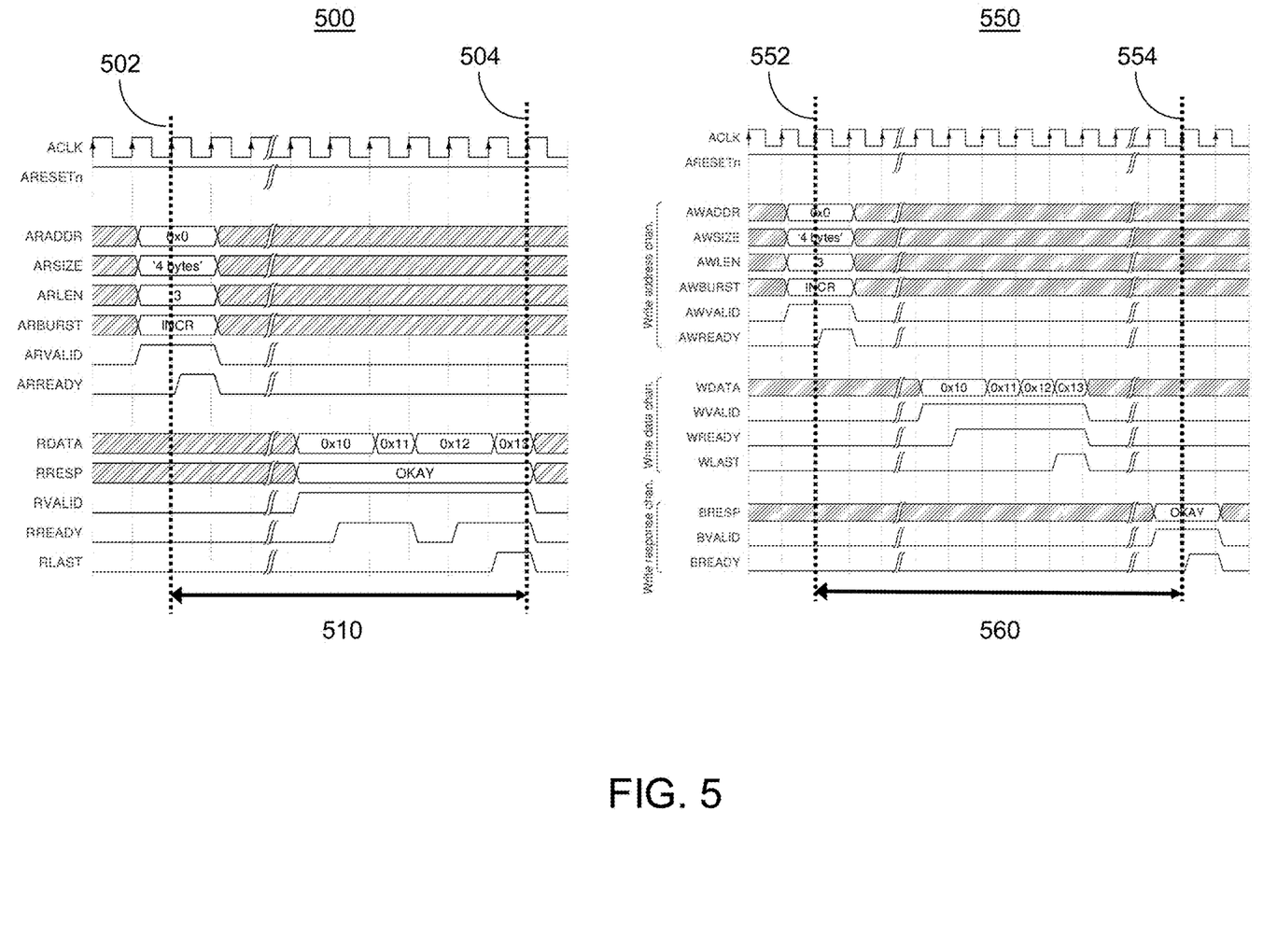
FIG. 5 illustrates timing diagrams and that show how latency is calculated, in accordance with some embodiments.

FIG. 5 illustrates timing diagrams 500 and 550 that show how latency is calculated, in accordance with some embodiments. The timing diagram 500 shows how a read latency is calculated, and the timing diagram 550 shows how a write latency is calculated. However, embodiments are not limited thereto, and users may set how latency is calculated depending on embodiments. The timing diagrams 500 and 550 are example write and read timing diagrams using the AXI protocol and embodiments are not limited thereto.

The timing diagram 500 shows states of a variety of signals (e.g., of the AXI protocol) including clock ACLK, a read address valid ARVALID, and a last beat identifier RLAST. The clock ACLK may include a clock signal used by the filter controller. The read address valid ARVALID may be a handshake signal that indicates that the transmitting side is ready to transmit the read address ARADDR to the receiving side. The last read data RLAST may rise when the last beat of data has been read.

A read address latency per transaction (or per read operation) 510 may be calculated as the time between time 502 when the read address valid ARVALID is high (according to a positive edge of the clock ACLK) and time 504 when the last read data RLAST is high (according to a positive edge of the clock ACKL). Then an average read latency may be calculated as the sum of read latency calculations divided by the number of total transactions (or total read operations) within the period.

The timing diagram 550 shows states of a variety of signals including clock ACLK, a write address valid AWVALID, and a write response valid BVALID. The clock ACLK may include the design clock that is used to latch in or read various from registers. The write address valid AWVALID may be a handshake signal that indicates that the transmitting side is ready to transmit the write address AWADDR to the receiving side. The write response valid BVALID may rise when the write data WDATA has been successfully written into the buffer 310 or 312.

A write address latency per transaction (or per write operation) 560 may be calculated as the time between time 552 when the write address valid AWVALID is high (according to a positive edge of the clock ACLK) and time 554 when the write response valid BVALID is high (according to a positive edge of the clock ACLK). Then an average write latency may be calculated as the sum of write latency calculations divided by the number of total transactions (or total write operations) within the period.

Figure 6:
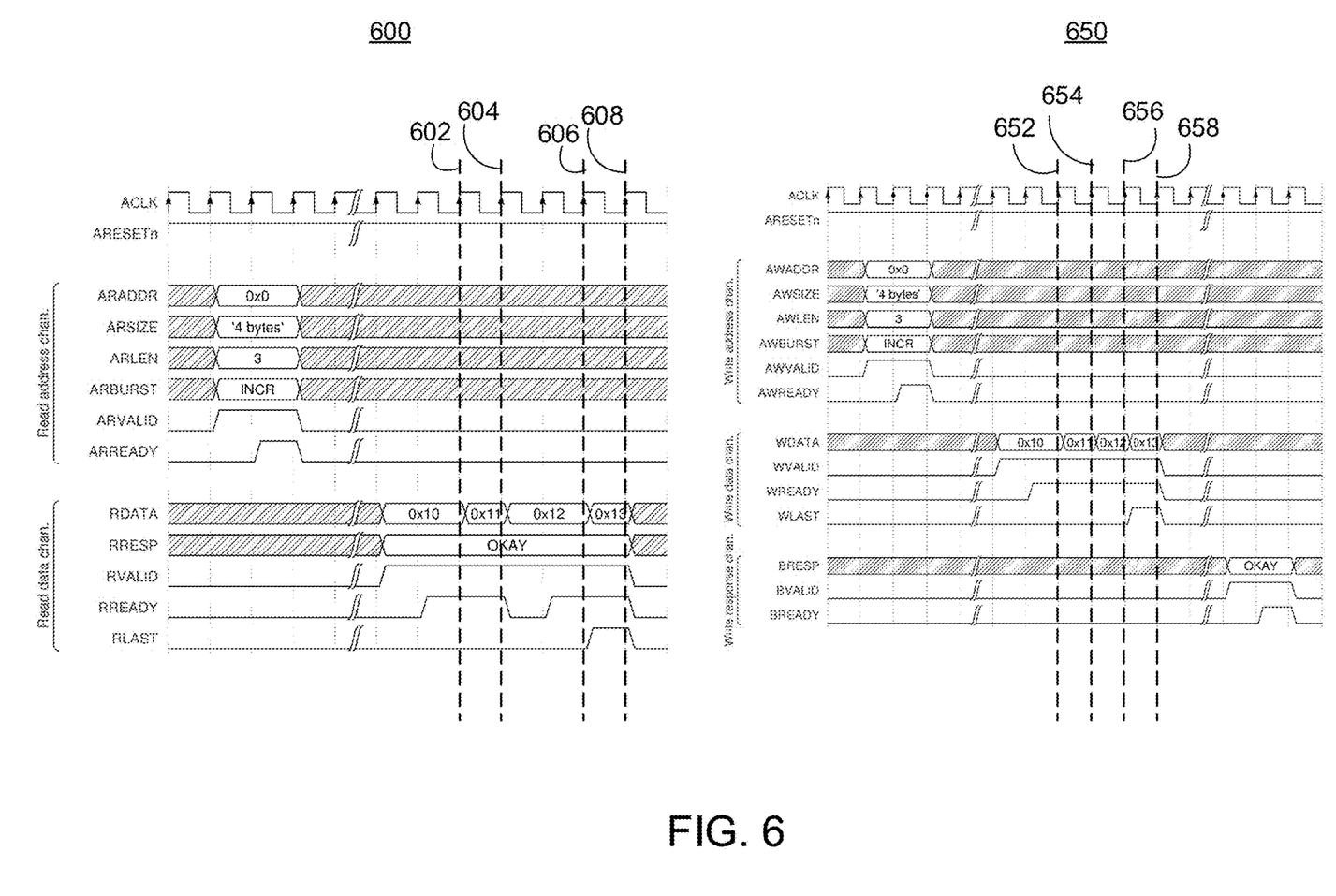
FIG. 6 illustrates timing diagrams and that show how bandwidth is calculated, in accordance with some embodiments.

FIG. 6 illustrates timing diagrams 600 and 650 that show how bandwidth is calculated, in accordance with some embodiments. The timing diagram 600 shows how a read bandwidth is calculated, and the timing diagram 650 shows how a write bandwidth is calculated. However, embodiments are not limited thereto, and users may set how latency is calculated depending on embodiments.

The timing diagram 600 shows states of a variety of signals including clock ACLK, a read data valid RVALID, and a read data ready RREADY. The clock ACLK may include a design clock that is used to latch in or read various from registers. The read valid RVALID may be a handshake signal in the read data channel that indicates the transmitting side has valid read data ready to be transmitted to the receiving side. The read data ready RREADY may be a handshake signal that receiving side is ready to receive the read data from the transmitting side. When both the read data valid RVALID and read data ready RREADY are high, read data may be transferred from the monitor 230 to the filter controller 240.

The read bandwidth may be defined as the number of read data transfers in a period (e.g., a window). This may be the number of times the read valid RVALID is equal to high and the number of times read ready RREADY is high, when the clock ACLK has a positive edge. Accordingly, within timing diagram 600, there may be four instances—time 602, 604, 606, and 608—when both the read valid RVALID and the read ready RREADY are high. Then the average bandwidth may be calculated as the product of the number of read data transfers and the data width (e.g., how many bits the read data RDATA is), divided by the product of the number of clock cycles of the clock ACLK and the frequency of the clock ACLK.

The timing diagram 650 shows states of a variety of signals including clock ACLK, a write valid WVALID, and a write ready WREADY. The clock ACLK may include a design clock that is used to latch in or read various from registers. The write valid WVALID may be a handshake signal in the write data channel that indicates the transmitting side has valid write data ready to be transmitted to the receiving side. The write data ready WREADY may be a handshake signal that indicates the receiving side is ready to receive the write data from the transmitting side. When both the write data valid WVALID and write data ready WREADY are high, write data may be transferred from the transmitting side to the receiving side.

The write bandwidth may be defined as the number of write data transfers in a period (e.g., a window). This may be the number of times the write valid WVALID is high and the number of times write ready WREADY is high, when the clock ACLK has a positive edge. Accordingly, within timing diagram 650, there may be four instances—time 652, 654, 656, and 658—when both the write valid RVALID and the write ready RREADY are high. Then the average bandwidth may be calculated as the product of the number of write data transfers and the data width (e.g., how many bits the write data WDATA is), divided by the product of the number of clock cycles of the clock ACLK and the frequency of the clock ACLK.

Performance data may also include various metrics based on the number of outstanding transactions, or multiple outstanding (MO). For example, a current MO may include the number of outstanding transactions within the period. For example, the current MO may be initialized to 0, since there are no outstanding transactions at the beginning of the emulation run or the window. Then the current MO may be incremented every time the write address valid AWVALID is high and the write address ready AWREADY is rising at the positive edge of the clock ACLK. The current MO may be decremented every time the write response valid BVALID is rising at the positive edge of the clock ACLK. Accordingly, the current MO will increase as more transactions (read or write) are requested but not completed, and the current MO will decrease as the requested transactions (read or write) are completed.

Performance data may also include an average MO which is the average number of MOs within a set period (e.g., window size). The average MO may be calculated as the total MO divided by the number of cycles of the clock ACLK within a period (e.g., a window). The total MO may be the sum of all current MO for every window that is being counted. Performance data may also include a minimum MO which is the minimum value of the current MO for the period and a maximum maximum MO which is the maximum value of the current MO for the period.

Performance data may also include a beat size count that measures the number of data transfers having a certain beat size within a window. For example, the beat size count may be the total number of transactions that have a certain size that the user can set. For example, the user may wish to know how many transactions have the beat size of 3 Bytes within the window. In this case, the user can set the beat size of 3.

Performance data may also include a burst length count that measures the number of beats within a burst within the window. For example, the burst length count may include the total number of transactions that have a certain number of beats that the user can set. For example, the user may wish to know how many bursts within a window have 4 beats. In this case, the user can set the number of beats inside a burst to 4.

Figure 7:
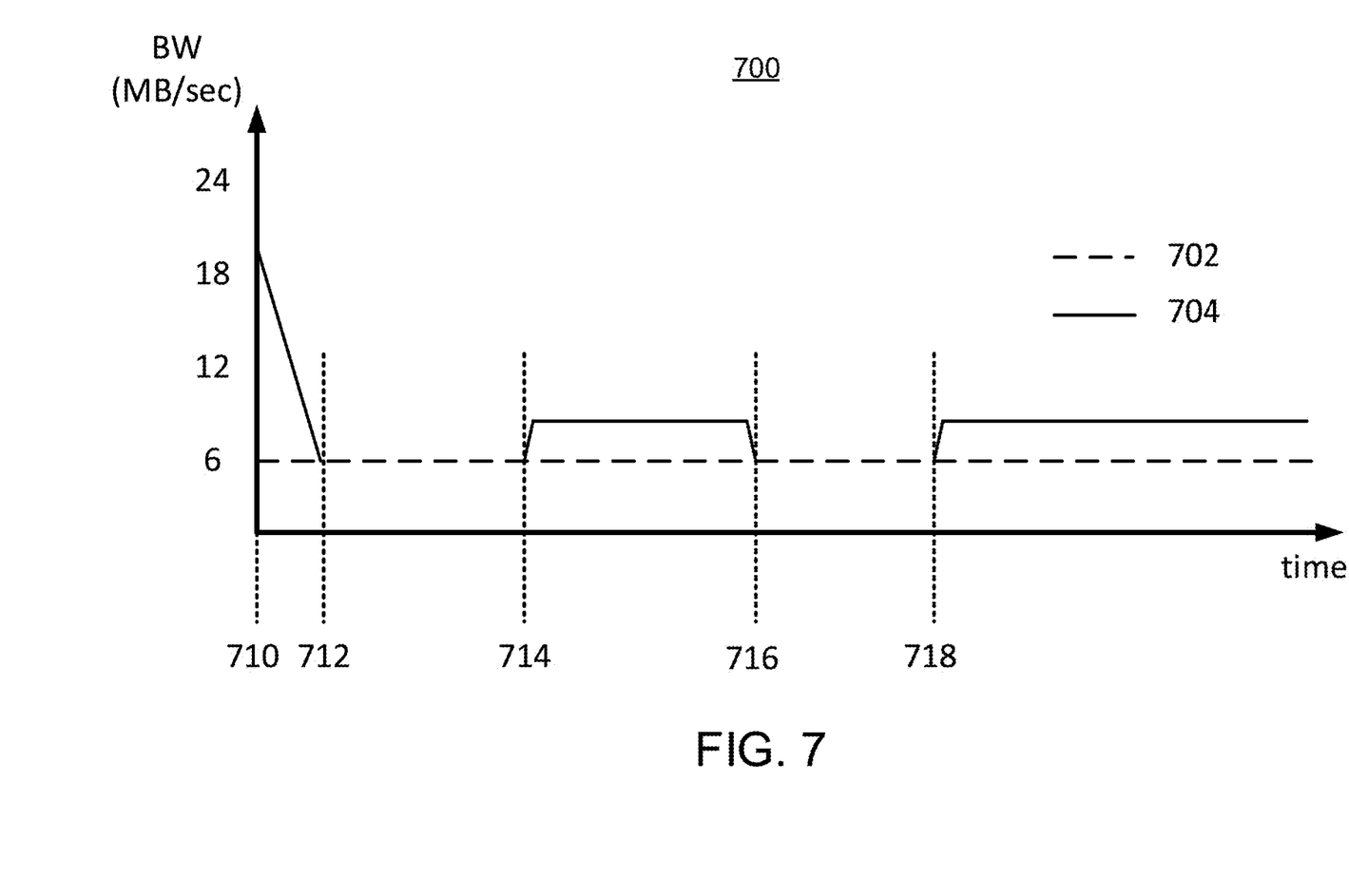
FIG. 7 illustrates a graph that shows how setting a minimum bandwidth may affect the performance data that is collected by the host, in accordance with some embodiments.

FIG. 7 illustrates a graph 700 that shows how setting a minimum bandwidth may affect the performance data that is collected by the host 120, in accordance with some embodiments. The x-axis of the graph 700 includes time and the y-axis of the graph 700 includes bandwidth (e.g., MB/s). The graph 700 includes lines 702 and 704.

The line 702 indicates a minimum bandwidth that the user is interested in. In this example, the minimum bandwidth is 6 MB/sec, but embodiments are not limited thereto. Accordingly, the filter controller 240 will only output the bandwidth data that is at minimum 6 MB/sec to the host 120. The line 704 is a line that illustrates when the bandwidth is at least 6 MB/sec. From the beginning of the emulation run at time 710, the bandwidth was above 6 MB/sec. Therefore, the performance data was transmitted to the host 120. Then between time 712 and time 714, the bandwidth dipped below 6 MB/sec. The performance data that was calculated between time 712 and 714 was erased and not transmitted to the host 120. Then at time 714, the bandwidth increased to be greater than 6 MB/sec and until time 716, the host 120 received performance data again. And between time 716 and time 718, the bandwidth dipped below 6 MB/sec again and the performance data was not sent to the host 120. Then at time 718, the bandwidth was greater than 6 MB/sec, and the performance data was transmitted to the host 120. Accordingly, the user can set the configuration parameter of a minimum bandwidth so that the host 120 used by the user only collects performance data when the bandwidth is at least the minimum bandwidth.

Figure 8:
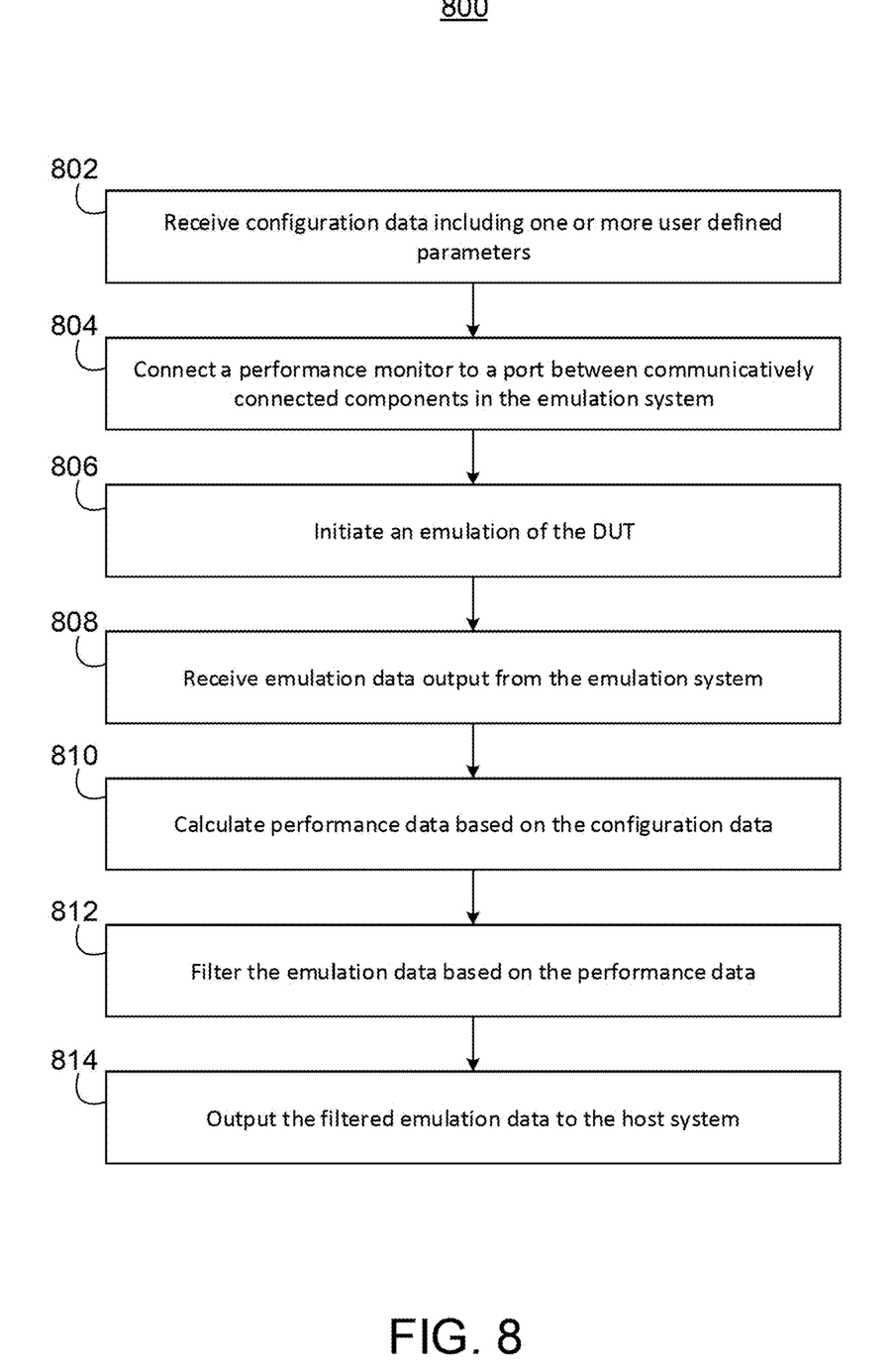
FIG. 8 illustrates flow chart of a method of emulating a DUT, in accordance with some embodiments.

FIG. 8 illustrates flow chart of a method 800 of emulating a DUT, in accordance with some embodiments. For example, the system 110 can perform method 800. It is to be understood that present implementations are not limited to the particular examples disclosed herein.

Step 802 includes receiving configuration data (e.g., stored in configuration registers 302) including one or more user defined parameters (e.g., configuration parameters). The user may provide the user defined parameters via the host 120 in the form of a configuration file and/or commands. The user defined parameters may include a window size, a read and/or write latency range, and/or outstanding read and/or write transaction ranges.

Step 804 includes connecting a performance monitor (e.g., monitors 230-236) to a port between communicatively connected components in the emulation system (e.g., emulation system 110). The port may be connected to any interface between components within the emulation system 110. For example, the port may be located between any AXI master and AXI slave. For example, the AXI master may be a processor and the AXI slave may be a memory or a peripheral component.

Step 806 includes initiating an emulation of the DUT. The user may initiate the emulation via the host 120.

Step 808 includes receiving emulation data (e.g., via the monitors 230-236) from the performance monitor. The window size may be defined by the user via the configuration parameters or be set to a default window size. The received monitoring data may include one or more AXI signals within the read/write address channels, read/write data channels, and read/write response channels.

Step 810 includes calculating (e.g., via window controller 306) performance data based on the emulation data. The calculations may include comparisons between the calculated performance data and the configuration parameters. A rule may be satisfied based on the comparisons (e.g., the performance data exceeds a threshold, the performance data is less than the threshold, and/or the performance data is within a threshold range).

Step 812 includes filtering (e.g., via window controller 306) the emulation data based on the performance data. Emulation data that has performance data satisfying the rule(s) may pass the filter and be provided to a controller (e.g., memory controller 308).

Step 814 includes outputting the emulation data to the host system (e.g., host 120). The memory controller 308 may be provide the data to the host 120.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method for emulating a design under test (DUT) using a system including an emulation system and a host system, the method comprising:
   receiving, by a processor in the emulation system from a host system, configuration data including one or more user defined parameters indicative of at least a window size;
   connecting, by the processor, a performance monitor to a port between communicatively connected components in the emulation system;
   initiating, by the processor, an emulation of the DUT;
   receiving, by the processor, emulation data output from the emulation system;
   calculating, by the processor, performance data based at least on the window size of the configuration data;
   filtering, by the processor, the emulation data into filtered emulation data, based on the performance data; and
   outputting, by the processor, the filtered emulation data to the host system based upon comparing first performance data of the performance data against second performance data of the performance data, the first performance data being stored at a first buffer and the second performance data being stored at a second buffer.

2. The method of claim 1, wherein the one or more user defined parameters includes a clock resolution defining the window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

3. The method of claim 2, wherein filtering the emulation data includes:
   comparing, by the processor, one of the one or more user defined parameters against the performance data from the performance monitor;
   when the comparison is satisfied, providing, by the processor, the emulation data to the host system; and
   when the comparison is not satisfied, erasing, by the processor, the emulation data.

4. The method of claim 1, further comprising:
  storing, in the first buffer of the emulation system, the filtered emulation data during a first window; and
  storing, in the second buffer of the emulation system, the filtered emulation data during a second window following the first window.

5. The method of claim 4, further comprising:
  when the second performance data of the second buffer is greater than the first performance data of the first buffer, outputting, by the processor, the filtered emulation data of the second buffer to the host system; and
  when the second performance data of the second buffer is less than or equal to the first performance data of the first buffer, erasing, by the processor, the filtered emulation data of the second buffer.

6. The method of claim 1, wherein the calculating the performance data includes counting a number of times when one or more signals of the emulation data are asserted.

7. The method of claim 6, wherein the one or more signals include Advanced extensible Interface (AXI) protocol signals.

8. The method of claim 7, wherein calculating the performance data includes performing one or more logic operations using one or more AXI protocol signals.

9. A system for monitoring performance of an emulated design under test (DUT), the system comprising:
  one or more processor having instructions stored thereon that, when executed by the one or more processors, causes the one or more processors to:
    receive, from a host system, configuration data including one or more user defined parameters indicative of at least a window size;
    connect a performance monitor to a port between communicatively connected components in an emulation system;
    receive emulation data of a DUT output from the emulation system;
    calculate performance data based at least on the window size of the configuration data;
    filter the emulation data into filtered emulation data, based on the performance data; and
    output the filtered emulation data to the host system based upon comparing first performance data of the performance data against second performance data of the performance data, the first performance data being stored at a first buffer and the second performance data being stored at a second buffer.

10. The system of claim 9, wherein the one or more user defined parameters includes a clock resolution defining the window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

11. The system of claim 10, wherein filtering the emulation data includes:
  comparing, by the processor, one of the one or more user defined parameters against the performance data from the performance monitor;
  when the comparison is satisfied, providing, by the processor, the emulation data to the host system; and
  when the comparison is not satisfied, erasing, by the processor, the emulation data.

12. The system of claim 9, further comprising:
  storing, in the first buffer of the emulation system, the filtered emulation data during a first window; and
  storing, in the second buffer of the emulation system, the filtered emulation data during a second window following the first window.

13. The system of claim 12, further comprising:
  when the second performance data of the second buffer is greater than the first performance data of the first buffer, outputting, by the processor, the emulation data of the second buffer to the host system; and
  when the second performance data of the second buffer is less than or equal to the performance data of the first buffer, erasing, by the processor, the emulation data of the second buffer.

14. The system of claim 9, wherein the calculating the performance data includes counting a number of times when one or more signals of the emulation data are asserted.

15. The system of claim 14, wherein the one or more signals include Advanced extensible Interface (AXI) protocol signals.

16. The system of claim 15, wherein calculating the performance data includes performing one or more logic operations using one or more AXI protocol signals.

17. A non-transitory computer readable medium including one or more instructions stored thereon and executable by a processor to:
  connect a performance monitor to a port between communicatively connected components in an emulation system;
  initiate an emulation of a design under test (DUT);
  receive emulation data output from the emulation system;
  calculate performance data based at least on a window size of configuration data including one or more user defined parameters indicative of at least the window size;
  filter the emulation data into filtered emulation data, based on the performance data; and
  output the filtered emulation data to a host system based upon comparing first performance data of the performance data against second performance data of the performance data, the first performance data being stored at a first buffer and the second performance data being stored at a second buffer.

18. The non-transitory computer readable medium of claim 17, wherein the one or more user defined parameters includes a clock resolution defining the window size, a minimum latency, a maximum latency, a latency range, minimum bandwidth, maximum bandwidth, bandwidth range, beat size count, burst length count, a minimum number of outstanding transactions, a maximum number of outstanding transactions, or a range of a number of outstanding transactions.

19. The non-transitory computer readable medium of claim 18, wherein the one or more instructions further cause the processor to:
  comparing, by the processor, one of the one or more user defined parameters against the performance data from the performance monitor;
  when the comparison is satisfied, providing, by the processor, the emulation data to the host system; and
  when the comparison is not satisfied, erasing, by the processor, the emulation data.

20. The non-transitory computer readable medium of claim 17, wherein the one or more instructions further cause the processor to:
  store, in the first buffer of the emulation system, the filtered emulation data during a first window; and store, in the second buffer of the emulation system, the filtered emulation data during a second window following the first window.

\* \* \* \* \*